A. T. BROWN.
MOTOR AGRICULTURAL MACHINE.
APPLICATION FILED OCT. 23, 1914.

1,372,335.

Patented Mar. 22, 1921.
4 SHEETS—SHEET 2.

WITNESSES:

INVENTOR.
Alexander T. Brown
BY
ATTORNEYS.

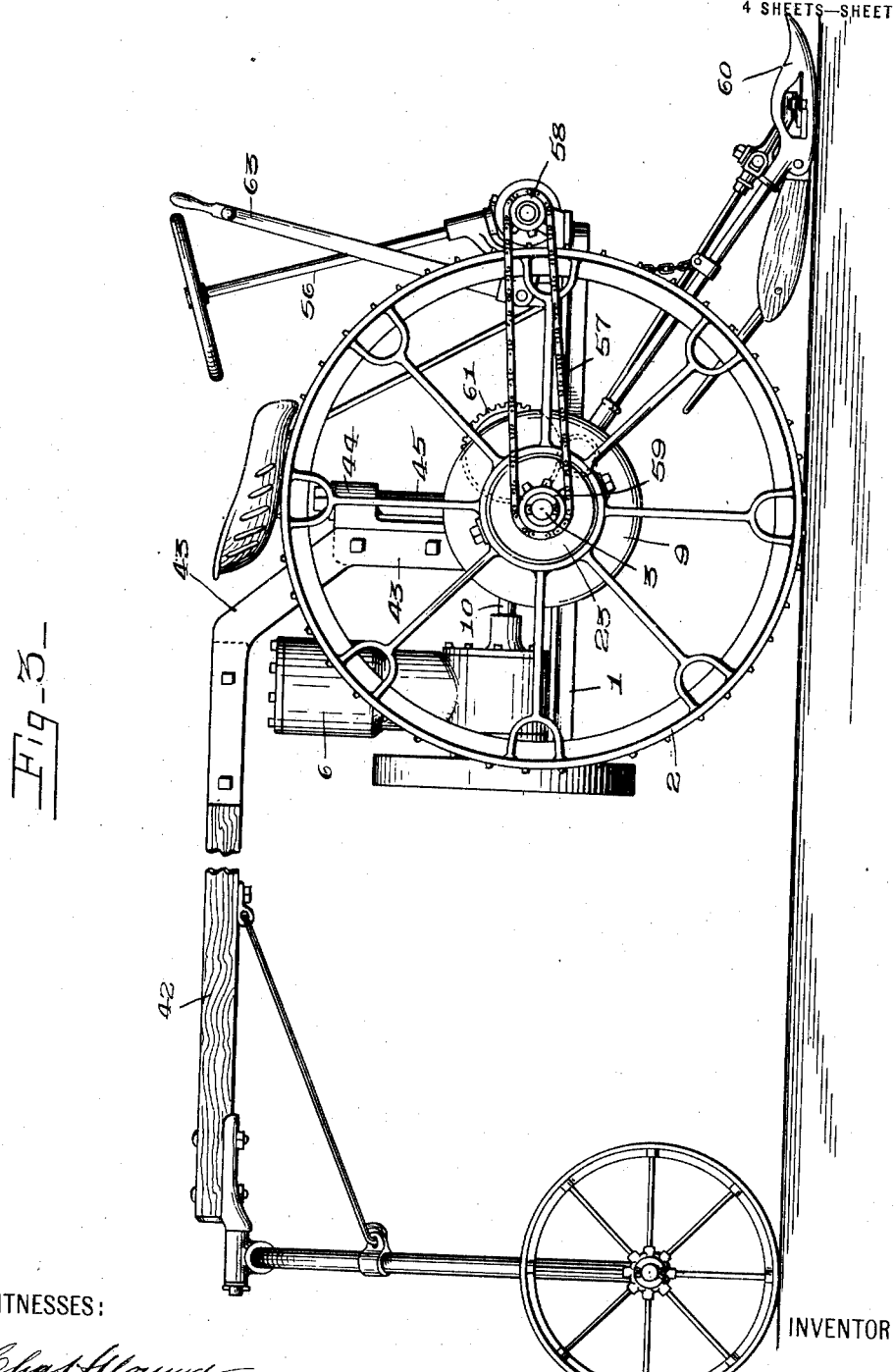

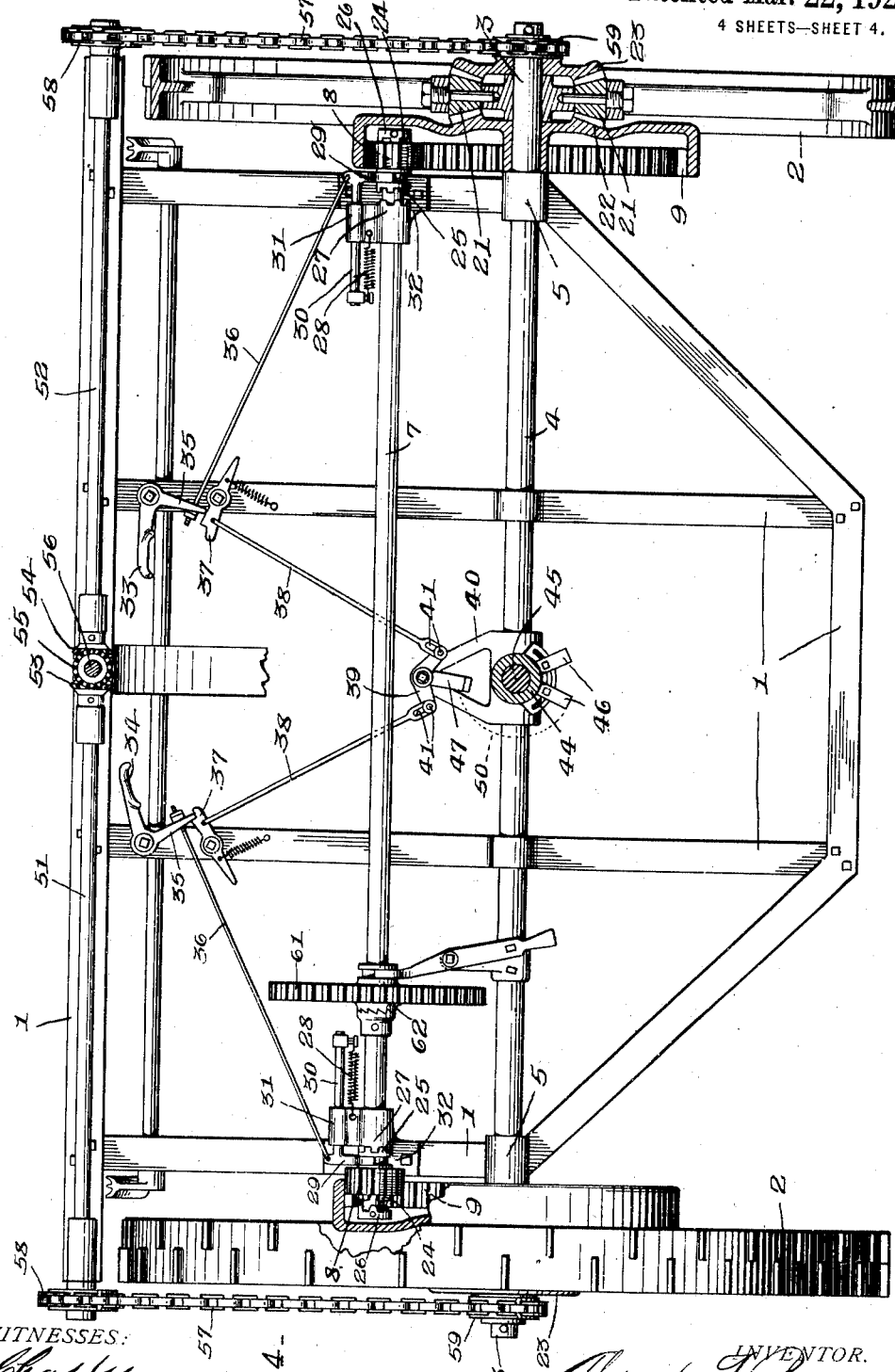

UNITED STATES PATENT OFFICE.

ALEXANDER T. BROWN, OF SYRACUSE, NEW YORK.

MOTOR AGRICULTURAL MACHINE.

1,372,335. Specification of Letters Patent. Patented Mar. 22, 1921.

Application filed October 23, 1914. Serial No. 868,154.

*To all whom it may concern:*

Be it known that I, ALEXANDER T. BROWN, a citizen of the United States, and a resident of Syracuse, in the county of Onondaga and State of New York, have invented a certain new and useful Motor Agricultural Machine, of which the following is a specification.

This invention relates to motor driven agricultural machines, and has for its object a particularly simple and efficient mechanism by which the steering and positioning of the machine is effected; and the invention consists in the novel features of construction hereinafter set forth and claimed.

In describing this invention, reference is had to the accompanying drawings, in which like characters designate corresponding parts in all the views.

Fig. 3 is an elevation of the machine.

Fig. 4 is an enlarged plan view of the front portion of the machine, parts being omitted.

Figure 1:
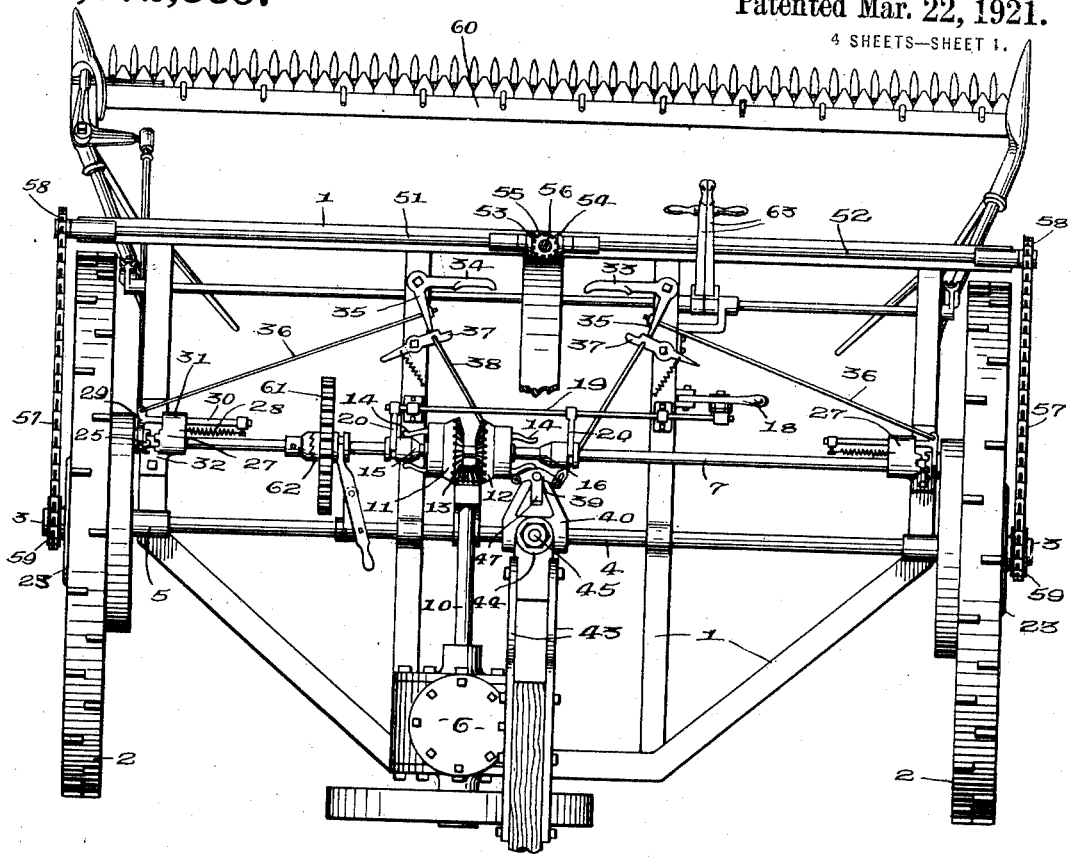
Figure 1 is a plan view, partly broken away, of this machine.

This machine comprises, generally, a frame, traction wheels on opposite sides of the frame, motor driven mechanism connected to the wheels to drive the same including means operable to disconnect either wheel so that the machine will be driven by the other wheel, and hence turn about a vertical center passing through the point where the disconnected wheel touches the ground. The machine also includes steering means which operates to actuate one traction wheel faster than the other is being driven by the motor driven mechanism.

1 is the frame of the machine, which may be of any suitable form, size and construction.

2 are the traction wheels mounted upon spindles 3, on opposite sides of the frame 1, these spindles being usually the end portions of an axle, or shaft 4, which extends entirely across the frame 1, and is held in suitable bearings 5 thereon.

6 is the motor supported by the frame 1, and connected to the mechanism which drives the wheels 2. This mechanism consists of the shaft 7 having members on opposite ends thereof which are connected to the traction wheels 2, respectively, and means for connecting and disconnecting said members and the wheels. Said members are here shown as pinions 8 which mesh with internal gears 9 loosely mounted on the spindles 3 and connected to the traction wheels 2, respectively.

The motor shaft 10 is connected to the shaft 7 by any suitable means here shown as beveled gears 11 and 12 mounted thereon and meshing with opposite sides of a pinion 13 on the motor shaft 10. The gears 11 and 12 are loosely mounted on the shaft 7 and are connected thereto by clutch mechanism carried thereby and here shown as including arms 14 which coact with expanders 15 and 16 slidable on the shaft 7 and operable by a hand lever 18. As here shown, the hand lever 18 actuates an endwisely movable rod 19 carrying the forks 20 which shift the expanders. The forks are so spaced apart that one expander is in position to clutch its companion gear as 11 to the shaft when the other expander is in position to permit the other gear as 12 to run loosely on the shaft, it being understood that the gear 11 produces forward speed and the gear 12 reverse.

The motion of the gears 9 is transmitted to the traction wheels 2 through planetary gears 21 carried by the wheels 2 around the axes of the spindles 3 and meshing with gear rings 22 on the gears 9, and with gears 23 loosely mounted, at the outer sides of the wheels 2, on the spindles 3, and normally held from movement by the hand steering mechanism to be described, so that rotation of either gear 9 forwardly will cause the pinions 21 meshing therewith to move planetarily, and hence the corresponding wheels 2 to be actuated forwardly.

The pinions 8 are loosely mounted upon the shaft 7 and are provided with clutch faces 24, 25, on opposite sides thereof which coact with clutch sections 26, rotatable with the shaft and clutch sections 27, non-rotatable with the shaft, the pinions 8 being normally clutched to the sections rotatable with the drive shaft, and means is provided for effecting relative axial shifting movement of the pinions 8 and the clutch sections. As here shown, the pinions 8 are shiftable axially relatively to the clutch sections 26, 27, the pinions 8 remaining in engagement with the internal gears 9 when disconnected from the shaft 7 in order to lock the wheel 2 disconnected from the shaft.

It is intended, however, that only one gear 8 be disconnected from the shaft 7 while the other remains in its normal position, so that the traction wheel 2 connected thereto will be actuated, while the other traction wheel is held from actuation, hence the machine will turn a curve about the point the held traction wheel engages the ground.

The clutch faces 24 are normally engaged with the clutch sections 26, on the ends of the shaft 7, and each pinion 8 is shiftable to disengage its clutch face 24, from the companion clutch section 26, and engage its clutch face 25 with the companion fixed clutch section 27. The pinions 8 are normally held with their clutch faces 24 interlocked with the clutch sections 26, by springs 28 acting on forks 29 which shift said pinions 8. The forks 29 are here shown as carried by rods 30, movable in the guides 31 which are formed integral with the clutch sections 27, each section 27 and guide 31 being carried by a bracket, the base 32 of which is bolted to the frame 1.

The pinions 8 are shifted out of operative position alternately against the actions of the springs 28, by right and left foot levers 33, 34, in the form of bell cranks pivoted at their angles and having arms 35 which are connected by means of rods 36 to the forks 29, so that movement of the levers 33, 34, will withdraw the forks 29 and shift the gears 8 inwardly into the position shown at the left of Fig. 4. The foot levers are held in their operative position by means of latches 37 coacting with the arms 35, the latches being spring-pressed, and being connected by links 38 to the opposite arms of the lever 39 pivoted between its ends to a bracket 40 mounted on the main shaft 4, the links 38 being connected to the lever 39 by pin-and-slot connections 41 which permit either lever 33, 34, to be operated without transmitting the motion thereof to the other of said levers.

The latches 37 are released by means coacting with the lever 39 after the machine has turned a predetermined distance.

Figure 2:
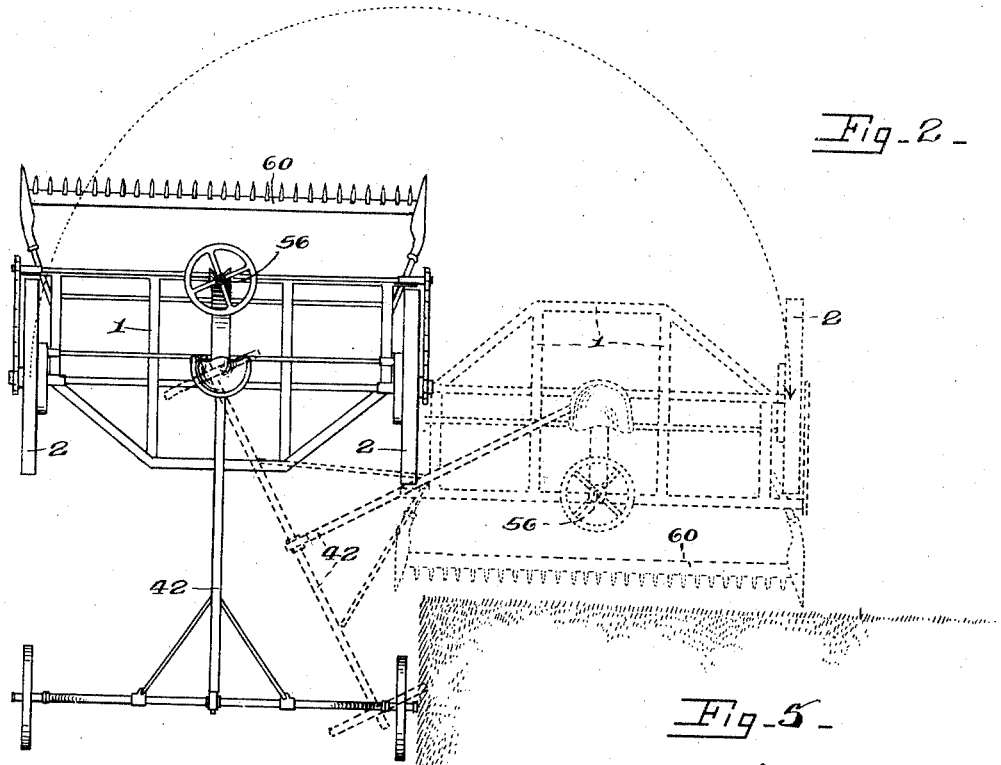
Fig. 2 is a diagrammatic view illustrating the operation of the machine when turning to the right, after the mower knife thereon has cut a swath, into position so that the mower is in position to cut the next swath.
Figure 6:
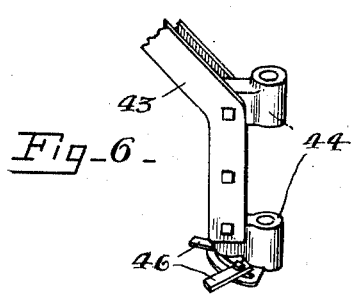
Fig. 6 is a detail view of the connection at the front end of the trailer.
Figure 5:
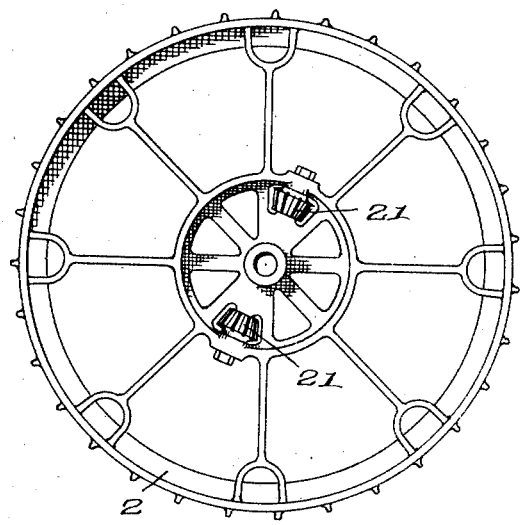
Fig. 5 is a detail view of one of the traction wheels.

Said means is here shown as a trailer 42, having a bracket 43 at its front end, the bracket having bearings 44 mounted upon a vertical spindle 45 carried by the bracket 40, and located substantially centrally thereof, and in a vertical plane containing the axis of the spindles 3. When the machine is turning to the right, as shown in Fig. 2, which turning is effected by operating the lever 33 so that the right hand traction wheel 2 is held from movement while the left hand wheel 2 receives all of the driving power, the trailer trails as indicated in dotted lines; and when the relative position of the frame 1 and the trailer changes to a certain extent, one of the stops 46 carried by one of the bearings 44 of the trailer engages a third arm 47 of the lever 39 and rocks the lever 39 to release the latch holding the lever 33.

In Fig. 4, the lever 34 is shown as operated, and when the mechanism is set in this position, the machine will turn to the left until the trailer occupies such position that the stop 46 will engage the arm 47 after the machine has turned to the left far enough to cause the arm 47 to describe the arc 50.

The hand steering mechanism comprises shaft sections 51, 52, arranged in axial alinement, means for turning the sections, and means for transmitting the motion of the shaft sections to the outer gears 23 on the spindles 3.

As here shown, the shaft sections are provided with bevel gears 53, 54, on their opposing ends, which mesh with the bevel gear 55 mounted on the steering post 56; and said shaft sections are connected at their outer ends to the gears 23 by means of sprocket chains 57 running over sprocket wheels 58, 59, mounted on each shaft section, and on the hubs of the gears 23, respectively.

Obviously, by turning the steering post, as for instance, to the left, the shaft section 52 will be rotated forwardly causing the gear 23 on the right hand spindle to be rotated forwardly, imparting a rotary motion to the planetary gears 21 in addition to that imparted to them by the gear 22, and at the same time the shaft section 51 will be rotated in a retrograde direction, causing its companion gear 23 to be rotated in a retrograde direction, thus retarding the forward rotation of the left hand wheel, and hence the machine will be turned to the left.

60 is an agricultural implement, as a mower, suitably carried on the front of the machine, and the movable knife thereof is actuated from the shaft 7, and for this purpose a driving gear 61 is provided on the shaft 7 which may be connected to, and disconnected from, the shaft 7 by a manually shiftable clutch section 62, in any suitable manner. The mower may also be raised and lowered by means of levers 63.

In operation the machine is steered across the field by the hand steering mechanism and the machine turned around and positioned to cut the next swath by the motor driven steering and driving mechanism.

What I claim is:

1. A motor driven machine comprising a frame, traction wheels on opposite sides of the frame, driving means connected to the traction wheels, steering means including normally stationary elements, one for each wheel, an actuating member and connections between the actuating member and each of said normally stationary elements to actuate the same and hence actuate one traction wheel faster than the driving means and the other traction wheel, and means for connecting and disconnecting either of the traction wheels at will from the driving means, substantially as and for the purpose set forth.

2. A motor driven machine comprising a frame, traction wheels on opposite sides of the frame, spindles upon which the traction wheels are loosely mounted, opposing gears loosely mounted on each spindle, on opposite sides of the traction wheel, planetary gears carried by each traction wheel and meshing with the opposing gears, motor driven mechanism connected to one of the opposing gears on each spindle, and means for holding the other of such gears from rotation, substantially as and for the purpose set forth.

3. A motor driven machine comprising a frame, traction wheels on opposite sides of the frame, spindles upon which the traction wheels are loosely mounted, opposing gears loosely mounted on each spindle, planetary gears carried by each traction wheel and meshing with the opposing gears, motor driven means connected to one of the opposing gears on each spindle, and means for normally holding the other of such gears from rotation, the last-mentioned means being operable to rotate the opposing gears to which it is connected, substantially as and for the purpose described.

4. A motor driven machine comprising a frame, traction wheels on opposite sides of the frame, spindles upon which the traction wheels are loosely mounted, opposing gears loosely mounted on each spindle, planetary gears carried by each traction wheel and meshing with the opposing gears, motor driven means connected to one of the opposing gears on each spindle, and steering means normally holding the other of such gears from rotation, and operable to rotate the one of the opposing gears to which it is connected, the steering means including shaft sections arranged end to end and having opposing gears thereon, a steering post having a gear meshing with both the gears of the shaft sections, and power-transmitting connections between each shaft section and one of the gears on the spindle, substantially as and for the purpose set forth.

5. A motor driven machine comprising a frame, traction wheels on opposite sides of the frame, motor driven mechanism connected to the wheels to drive the same, said mechanism including a drive shaft, members driven by the drive shaft and connected to the traction wheels, respectively, and means operable to disconnect either member from the shaft, and to lock from rotation the traction wheel connected to the member which is disconnected from the shaft and manually operable means for effecting a rotary movement of the traction wheels relatively to the movement of such wheels effected by the drive shaft, substantially as and for the purpose specified.

6. A motor driven machine comprising a frame, traction wheels on opposite sides of the frame, motor driven mechanism connected to the wheels to drive the same, said mechanism including a drive shaft, members on the shaft, connected to the traction wheels, respectively, clutch sections non-rotatable with the shaft, clutch sections rotatable with the shaft, each member being provided with clutch faces on opposite sides thereof, the clutch face on one side normally engaging one of the clutch sections associated with the shaft, and means for effecting relative axial movement of the clutch sections and the members to disengage either member from the clutch section rotatable with the shaft and engage the same with the non-rotatable clutch section, substantially as and for the purpose set forth.

7. A motor driven machine comprising a frame, traction wheels on opposite sides of the frame, motor driven mechanism connected to the wheels to drive the same, said mechanism including a drive shaft, members driven by the shaft and connected to the traction wheels, manually operable means to disconnect either member and the traction wheel connected thereto from the shaft, whereby the machine will turn a corner driven by the other wheel, and a trailer co-acting with the last-mentioned means to return the parts of the driving mechanism to their normal position after the machine has turned a predetermined distance, substantially as and for the purpose described.

8. A motor driven machine comprising a frame, traction wheels on opposite sides of the frame, motor driven mechanism connected to the wheels to drive the same, said mechanism including a drive shaft, members driven by the shaft and connected to the wheels respectively, means operable to disconnect either member from the shaft, whereby the machine may be driven from either traction wheel to turn the machine, a trailer co-acting with the last mentioned means to return the parts of the driving mechanism to their normal position after the machine has turned a predetermined distance, and manually-operated steering means operable to actuate one traction wheel faster than the other and retard the rotation of the latter, substantially as and for the purpose set forth.

9. A motor driven machine comprising a frame, traction wheels on opposite sides of the frame, spindles upon which the traction wheels are loosely mounted, opposing gears loosely mounted on each spindle on the inner and outer sides of each traction wheel, planetary gears carried by each wheel and meshing with the opposing gears, a motor driven shaft, members driven by said shaft and connected to the gears on the inner and outer sides of the traction wheels, means operable to connect and disconnect either of said members and the shaft, and to lock from rotation the member disconnected from the shaft, and manually-operated steering means connected to the gears on the outer sides of the traction wheels and normally acting to hold said outer gears from rotation and operable to rotate one faster than the other, substantially as and for the purpose described.

10. A motor driven machine comprising a frame, traction wheels on opposite sides of the frame, motor driven mechanism connected to the wheels to drive the same and including means operable to connect and disconnect either traction wheel from the driving mechanism, said means including shiftable parts, right and left levers operating for shifting said parts out of operative position, a trailer pivoted to the frame and having means for releasing said parts to permit the same to return to their normal position when the trailer is turned a predetermined distance, substantially as and for the purpose specified.

11. A motor driven machine comprising a frame, traction wheels on opposite sides of the frame, motor driven mechanism connected to the wheels to drive the same and including means operable to connect and disconnect either traction wheel from the driving mechanism, said means including shiftable parts, right and left levers operating for shifting said parts out of operative position, and latches for holding each part in the position it has been shifted by its companion lever, and a trailer pivoted to the frame and having knock-off devices for releasing the latches after the trailer has turned a predetermined distance, substantially as and for the purpose set forth.

12. A motor driven machine comprising a frame, traction wheels on opposite sides of the frame, motor driven mechanism connected to the wheels to drive the same and including means operable to connect and disconnect either traction wheel from the driving mechanism, said means including shiftable parts, right and left levers operating for shifting said parts out of operative position, and latches for holding each part in the position to which it has been shifted by its companion lever, a lever pivoted between its ends to the frame, a link connecting opposite arms of the last-named lever, and the latches, respectively, and a trailer pivoted to the frame and having a knock-off device for engaging said lever when the trailer is turned a predetermined distance, substantially as and for the purpose described.

In testimony whereof, I have hereunto signed my name in the presence of two attesting witnesses, at Syracuse, in the county of Onondaga, in the State of New York, this 1st day of Sept., 1914.

ALEXANDER T. BROWN.

Witnesses:
S. Davis,
J. Glazier.